(12) United States Patent
Lans

(10) Patent No.: US 9,056,270 B2
(45) Date of Patent: Jun. 16, 2015

(54) AIR INTAKE FOR A PLANT

(75) Inventor: Erik Lans, Trosa (SE)

(73) Assignee: CAMFIL AB, Trosa (SE)

( * ) Notice: Subject to any disclaimer, the term of this patent is extended or adjusted under 35 U.S.C. 154(b) by 180 days.

(21) Appl. No.: 13/513,985

(22) PCT Filed: Dec. 18, 2009

(86) PCT No.: PCT/EP2009/067572
§ 371 (c)(1),
(2), (4) Date: Jul. 3, 2012

(87) PCT Pub. No.: WO2011/072756
PCT Pub. Date: Jun. 23, 2011

(65) Prior Publication Data
US 2012/0272632 A1 Nov. 1, 2012

(51) Int. Cl.
*B01D 59/50* (2006.01)
*B01D 46/00* (2006.01)
*B01D 46/02* (2006.01)
(Continued)

(52) U.S. Cl.
CPC .......... *B01D 46/0023* (2013.01); *B01D 46/008* (2013.01); *B01D 46/023* (2013.01); *B01D 46/12* (2013.01); *F02C 7/055* (2013.01); *F05D 2260/607* (2013.01)

(58) Field of Classification Search
CPC .............. B01D 46/10; B01D 46/2411; B01D 46/0024; B01D 8/00; B01D 39/1623; F23J 15/022
USPC ........ 55/307, 309.1, 478, 482, 487–489, 498; 95/273; 210/273, 323.1, 335, 767
See application file for complete search history.

(56) References Cited

U.S. PATENT DOCUMENTS

| 3,606,740 A | 9/1971 | Ballennie |
| 3,691,736 A | 9/1972 | Neumann |
| 6,923,911 B1 | 8/2005 | Beier et al. |

(Continued)

FOREIGN PATENT DOCUMENTS

| CA | 885589 A | 11/1971 |
| DE | 19716696 C1 | 7/1998 |

(Continued)

OTHER PUBLICATIONS

International Search Report.
(Continued)

*Primary Examiner* — Jason M Greene
*Assistant Examiner* — Karla Hawkins
(74) *Attorney, Agent, or Firm* — Harness, Dickey & Pierce, P.L.C.

(57) ABSTRACT

An air intake includes an air channel for an air stream passing through the air intake into the plant, and a particle filter assembly arranged in the air channel for removing particles from an air stream passing through the air channel, the particle filter assembly including a front and a back filter unit. The front filter unit is arranged before and in series with the back filter unit such that an air stream passing through the air channel passes through the front filter unit before passing through the back filter unit. The front filter unit is removable and replaceable by a fresh front filter unit while the back filter unit remains in the air channel and while an air stream is passing through the air channel during operation of the plant. The front filter unit has at least equal efficiency and dust holding capacity as the back filter unit.

10 Claims, 4 Drawing Sheets

Fig. 1

(51) Int. Cl.
   *B01D 46/12*       (2006.01)
   *F02C 7/055*       (2006.01)

(56) References Cited

U.S. PATENT DOCUMENTS

2005/0115222 A1\* 6/2005 Blomquist et al. .............. 60/274
2009/0031682 A1   2/2009 Langlands et al.
2010/0050873 A1   3/2010 Hiner et al.

FOREIGN PATENT DOCUMENTS

| | | |
|---|---|---|
| EP | 2159396 A2 | 3/2010 |
| GB | 1305812 A | 2/1973 |
| WO | WO-2009018444 A1 | 2/2009 |

OTHER PUBLICATIONS

"Particulate air filters for general ventilation—Determination of the filtration performance," European Standard for Coarse and Fine Filters, pp. 1-71, Nov. 2002.

\* cited by examiner

AIR INTAKE FOR A PLANT

TECHNICAL FIELD OF THE INVENTION

The present invention relates to an air intake for a plant, the air intake comprising an air channel and a particle filter assembly arranged in the air channel.

BACKGROUND ART

Air intakes are arranged to supply air to buildings, and/or to machinery or an industrial process of a plant. Normally, the source of the air supply is the ambient, outside air. However, in many location the outside air contains particles, such as for example dust, pollen, mould, salt particles or the like, which may be harmful or unwanted in the supplied air. Therefore, air intakes are in many applications provided with a particle filter for removing such solid unwanted particles from an air stream passing through the air intake.

As an example, air intakes for gas turbine plants are usually provided with one or more particle filters for removing particles from an air or gas flow such that particles are hindered to enter the turbine. With this, potential damage risks such as for example turbine fouling (adhesion of the particles to the rotor blades in the gas turbine air compressing device), corrosion, and erosion (particles that wear on the rotor blades) may be impeded. Thus, filters are provided to ensure continuous operation of the gas turbine plant so that a continuous electricity generation output from the gas turbine can be maintained.

After a certain time of operation, dependent on the ambient conditions in which the gas turbine operates, a large quantity of particles is accumulated in the filters. As a consequence, the pressure drop over the filter (the filter resistance) increases, causing a rise in energy consumption for driving the air stream, a drop in the flow rate of the air stream and/or, a drop in output from the gas turbine plant. Possibly, particles may leek from the filters and follow the air stream into the gas turbine plant. Such a particle intrusion may lead to a deteriorated gas turbine operation, costly maintenance, and/or possibly, a gas turbine breakdown. In order to repair the gas turbine, it may be necessary to shut down the gas turbine plant, which results in an electricity output loss and associated losses in standstill of equipments driven thereby. Therefore, the filters in such air intakes for a plant, for example for a gas turbine plant, are regularly removed and replaced by fresh filters.

However, a filter replacement may raise several problems. If the filter is removed from an intake device during operation of the plant, harmful particles have free passage into the plant causing the above described problems. On the other hand, shut down of the plant is undesired due to complicated process for stopping and start-up, as well as the economical loss associated with standstill.

In the prior art, a rough pre-filter is sometimes mounted before and in series with a high efficiency main filter for protection and prolongation of the life time of the main filter, or in other words, prolongation of the time until a it is necessary to replace the main filter due to an unacceptable rise in pressure drop or an unacceptable risk of particle leakage. However, in some applications, the life time of the main filter and the time interval for main filter exchange is still experienced as too short.

SUMMARY OF THE INVENTION

It is therefore an object of the present invention to provide an air intake for a plant that alleviates at least some of the above-mentioned problems.

According to the invention, this object is achieved by the air intake according to claim 1.

The air intake according to the invention, which is suitable for a plant, comprises an air channel for an air stream passing through the air intake into the plant and a particle filter assembly arranged in the air channel for removing particles from an air stream passing through the air channel. The particle filter assembly comprises a front filter unit and a back filter unit. The front filter unit is arranged before and in series with the back filter unit such that an air stream passing through the air channel passes through the front filter unit before passing through the back filter unit. The air channel is such constructed and the front filter unit is such arranged in the air channel that the front filter unit is removable and replaceable by a fresh front filter unit while the back filter unit remains in the air channel and while an air stream is passing through the air channel during operation of the plant. The front filter unit has at least equal efficiency and dust holding capacity as the back filter unit.

Due to that the front filter is accessible for removal and replacement while an air stream is passing through the air channel and without having to remove the back filter together with the front filter, the front filter can be exchanged while the plant is operating. Thus, the plant does not need to be shut down for reasons of accessing the front filter, and, during the short time when there is no front filter in place, the back filter will protect the plant from harmful particles following the air stream that passes through the air channel of the air intake according to the invention. Consequently, the operation of front filter exchange needs not influence the operation of the plant and can be performed often.

In addition, according to the invention, the front filter and the back filter have at least the same efficiency and dust holding capacity. If two filters that have the same efficiency and dust holding capacity are arranged in series in a particle containing air stream, more particles are caught by the first filter than by the second as seen in the direction of the air stream. This is even more the case, if the first filter has a higher efficiency and dust holding capacity than the second filter. Consequently, according to the invention, the front filter will collect most of the incoming, harmful particles and thus to some extent spare the back filter. In other words, since exchange of the front filter can take place during operation of the plant, the front filter can be exchanged often so that the load on the back filter is kept low during normal operation with both filters in place. Thus, the back filter will have the capacity to alone collect sufficient incoming particles during front filter exchange so that the operation of the plant is not jeopardized during those periods. Therefore, the time until the back filter needs to be exchanged and the plant must stand still if not an unfiltered air stream is to enter the plant, can be considerable extended as compared to prior art solutions having a low efficiency pre-filter for catching the few larger particles, and a high efficiency main filter for catching the major amount of particles. In these prior art solutions, the main filter will clog fast even if the pre-filter is exchanged frequently.

The efficiency of a filter is to be understood as the ability of the filter to remove particles from an air stream. The filter efficiency can be counted as the ratio of particles trapped by a filter over the total number of particles found in the air upstream of the filter. A count of the downstream particles is often used to determine the number of particles trapped by the filter. Filter efficiency can either be based on specific particle size ranges or based on the total number of particles of all sizes. There are numerous testing procedures utilized for determining filter efficiency. Normally, the efficiency of an air filter increases as more particles are collected or trapped in the filter.

The dust holding capacity of a filter is to be understood as the amount of dust the filter can hold when it operates at a specified airflow rate to a selected maximum resistance value. There are many different testing procedures for establishing the dust holding capacity of a filter, which often utilize a specified standard dust comprising specified percentages of particles of different sizes, i.e. having diameters within specified ranges. The higher the dust holding capacity of a filter is, the more dust will be hold in the filter without leaking.

Resistance refers to the static-pressure drop across the filter at a given face velocity. An increase of the resistance, or in other words, of the pressure drop over the filter, causes a rise in energy consumption for driving the air stream or a drop in the flow rate of the air stream.

The invention relates to an air intake for a plant. The air intake can be any type of air intake for plant comprising an air channel for guiding air, for example ambient air from outside the plant to the inside thereof, air from a one position inside the plant to another position inside the plant, or for guiding air from another building or plant to the plant, or the like.

The air can be ventilation air or air that is needed by a process conducted inside the plant.

The plant can be a building, machinery or fixtures employed in carrying out an industrial business, for example a factory or workshop for the manufacture of a particular product. The pant can constitute buildings and other physical equipment of an institution, in particular buildings housing operations where constant supply of clean air is critical, for example special rooms in hospitals or the like. Another example of a plant is a power plant, i.e. an electric utility generating station, such as a gas turbine plant.

According to one embodiment of the invention, the air intake is a gas turbine plant air intake.

According to the invention, a particle filter assembly is arranged in the air channel of the air intake. The filter assembly is such arranged in the air channel that an air stream flowing through the air channel towards the plant passes through the filter assembly.

The filter assembly comprises a front filter unit and a back filter unit, which are arranged in series. The front filter unit and the back filter unit are such arranged that the air stream passing through the air channel and through the filter assembly in the direction towards the plant, will pass first through the front filter unit and then through the back filter unit. The front filter unit can in this respect be regarded as a first filter unit. The back filter unit can analogously be regarded as a second filter or an aft filter unit. In embodiments of the invention where the front filter unit has a higher efficiency and a higher dust holding capacity than the back filter unit, the front filter can also be regarded as a main filter unit and the back filter as an auxiliary filter unit.

A complete filter unit normally comprises a filter body attached to a frame for support and mounting. The filter body comprises a filtering material through which the air stream to be filtered is directed and in which particles are trapped and collected. The filtering material often is a sheet like material having a mainly two-dimensional extension. The filtering material is normally cut; folded or pleated; and sewn, glued, welded or laminated to form the filter body. The filter body can, for example be in the form of one or several pockets/bags or a pleated unit.

The filtering material can comprise one or several layers of the same or different materials. Examples of material are fibre materials, such as glass fibres or polymer fibres. The fibre material can be woven or non-woven.

The front filter unit has at least equal efficiency and dust holding capacity as the back filter unit.

The efficiency of the front filter unit is optimized for the indented use thereof, i.e. the ability of the filter to remove those particles that are harmful to or unwanted in the plant in question and the intended operation thereof. Correspondingly, the dust holding capacity of the front filter unit is selected so that front filter unit will hold dust containing those harmful or unwanted particles.

According to one embodiment of the invention, the front filter unit is constructed such that, if a particle containing air stream is directed there through, at least 90% of particles having 0.4 micrometer average diameter are caught in the filtering material of the front filter unit. If tested under the conditions that the air flow is 0.944 m3/s and the maximal final pressure drop over the filter is 450 Pa, such a filter belongs to the filter class F8 or better according to EN 779/2002, which is the "New European Standard for Coarse and Fine Filters" established by the European Committee for Standardization, Technical Committee 195 and Work Group 1 (CEN/TC195-WG1) in 2002.

The efficiency and dust holding capacity of the back filter unit can be selected such that the back filter unit is able to operate all the time between two scheduled stand stills of the plant, i.e. together with the front filter unit during normal operation and without the front filter unit during front filter unit replacement periods. Scheduled stand stills of a plant can be due to periodical inspection or standard maintenance. In some cases, due to the back filter unit having lower efficiency and dust holding capacity than the front filter unit, some penetration of unwanted or even harmful particles into the plant can be tolerated during the rather short periods of front filter unit exchange.

The filter assembly can comprise additional support structures for supporting the pleats of a pleated filter body or for preventing the pockets of a pocket filter to collapse or abut each other. The support structure can be part of a filter unit or constitute a separate unit.

The front filter unit is accessible arranged in the air channel. This can be realized in many different ways, the air channel can have large dimensions such that an operator can enter inside the air channel or the front filter can be arranged close to the air inlet of the air channel or close to a maintenance hatch, for example. There is a free passway for the front filter unit into and out of the air channel.

The front filter unit is removable mounted in the air channel for enabling replacement thereof. This can be achieved by any suitable means such as by locking elements, or by friction. The locking elements can be of any suitable kind, for example, screws, screws and nuts, interlocking elements, snapping elements or the like.

The front filter unit may be removable attached to the air channel, to the back filter unit, which then in turn is attached to the air channel, or to both the air channel and the back filter unit.

The design of the air channel is adapted to the intended use of the plant in question, such that the air stream speed at the front filter unit is below a level where the front filter can be removed and replaced during operation of the plant. This can be done by adapting the dimensions of the air channel such that air stream speed (or the face velocity of the air stream at front filter unit) is below an upper limit while the plant receives the necessary flow rate of air. In principle, the same amount of air can be supplied to a plant by an air channel having a small cross section, which guides an air stream with a high speed, or by an air channel having a large cross section, which guides an air stream at a corresponding lower speed. Thus, with an air channel with larger dimensions, the air can be supplied at a lower speed. The maximal acceptable air speed can differ between different applications and depends on how difficult it is to access the front filter unit, how any locking means for dismounting and mounting of a front filter unit are constructed, the size and bulkiness of the front filter unit, for example. The air channel design may allow exchange of the front filter unit during normal operation of the plant, or during an operational mode with reduced air flow rate. However, the design of the air intake according to the invention allows the plant to be operated and supplied with air through the air channel during front filter exchange.

The front filter unit can constitute a pocket filter and comprise a filter body including several filter pockets. The back filter unit can constitute a pocket filter and comprise a filter body including several filter pockets.

According to one embodiment of the invention, both the front filter unit and the back filter unit are pocket filters, wherein the filter pockets of the front filter unit are arranged inside the filter pockets of the back filter unit. This is advantageous because the two filter units require only little space when mounted in series in the air channel. The available space is in many air intakes limited, especially with respect to air intakes for gas turbine plants.

In this embodiment, the presence of an air stream during front filter unit exchange is even an advantage. During dismounting, or removal, of the front filter, the air stream holds the pockets unfolded such that the risk of entanglement is reduced. During mounting of a fresh front filter unit, the air pressure of the air stream will aid in getting the pockets of the front filter unit into place inside the pockets of the back filter unit and to ensure proper unfolding of the pockets.

The back filter unit is mounted in the air channel such that it can be dismounted and replaced by a fresh back filter unit. To this end, the back filter unit can be releasable mounted in the air channel. This can be achieved by any suitable means such as by locking elements, or by friction. The locking elements can be of any suitable kind, for example, screws, screws and nuts, interlocking elements, snapping elements or the like.

The air channel according to the invention can be provided with additional filter units in series or in parallel, with respect to the air stream, with the front filter unit and/or the back filter unit of the particle filter assembly according to the invention.

The air intake according to the invention can be provided with several particle filter assemblies which are coupled in parallel with respect to the air stream. This can be realized with a rack construction holding the particle filter assemblies, which each comprise a front filter unit and a back filter unit, in rows and columns forming a filter wall through which the air stream has to pass during passage through the air channel.

BRIEF DESCRIPTION OF THE DRAWINGS

The invention may be performed in many various ways, and by way of example only, embodiments thereof will now be described in detail with reference being made to the accompanying drawings, in which.

DETAILED DESCRIPTION OF PREFERRED EMBODIMENTS OF THE INVENTION

Figure 1:
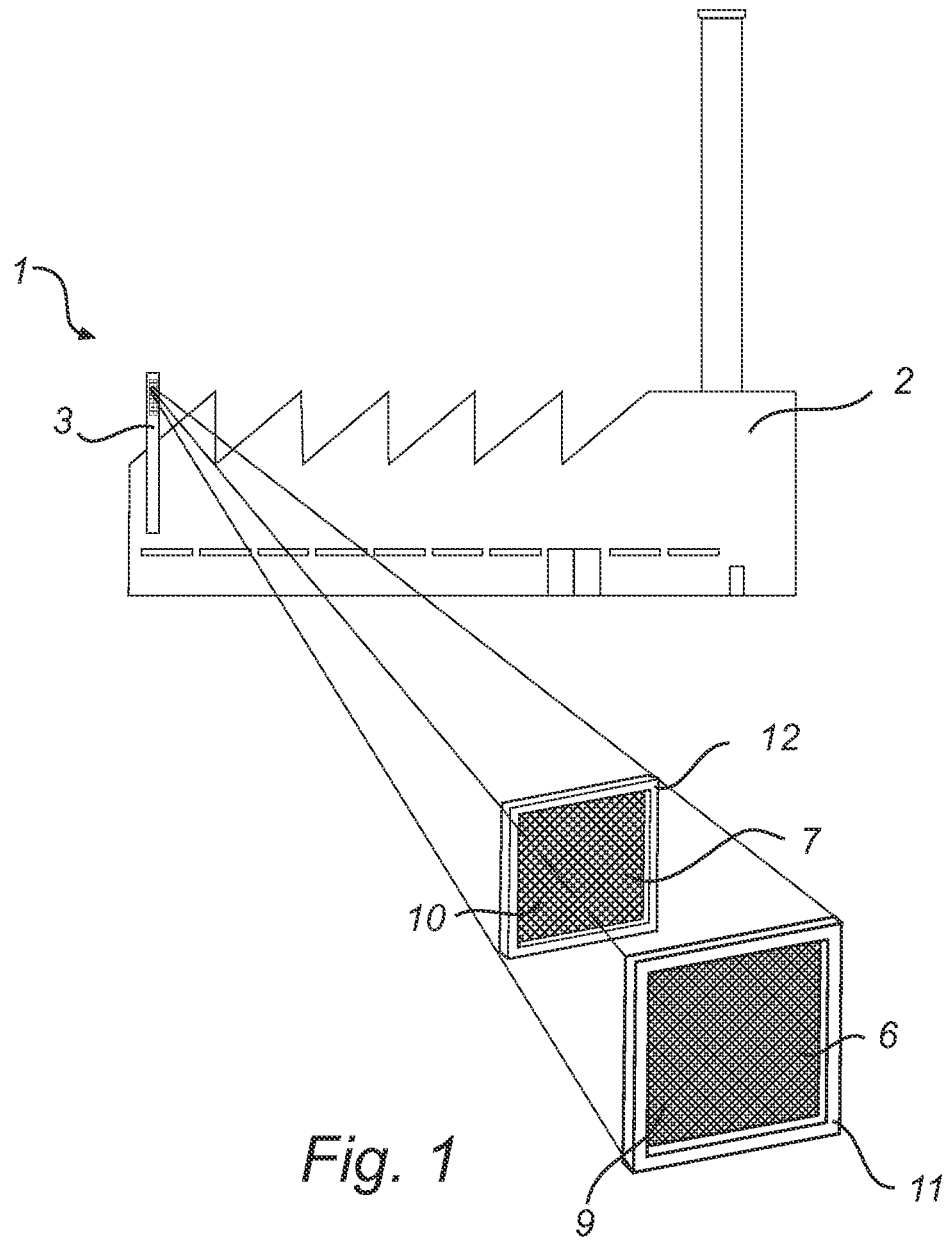
FIG. 1 is schematic view of an air intake for a plant according to the invention.

A schematic layout of an air intake according to the invention is shown in FIG. 1. An air intake 1 for a plant is arranged for leading ambient air into the plant 2.

In the example embodiment of FIG. 1, the air intake 1 is intended for a plant 2 in the form of a factory building.

Figure 2:
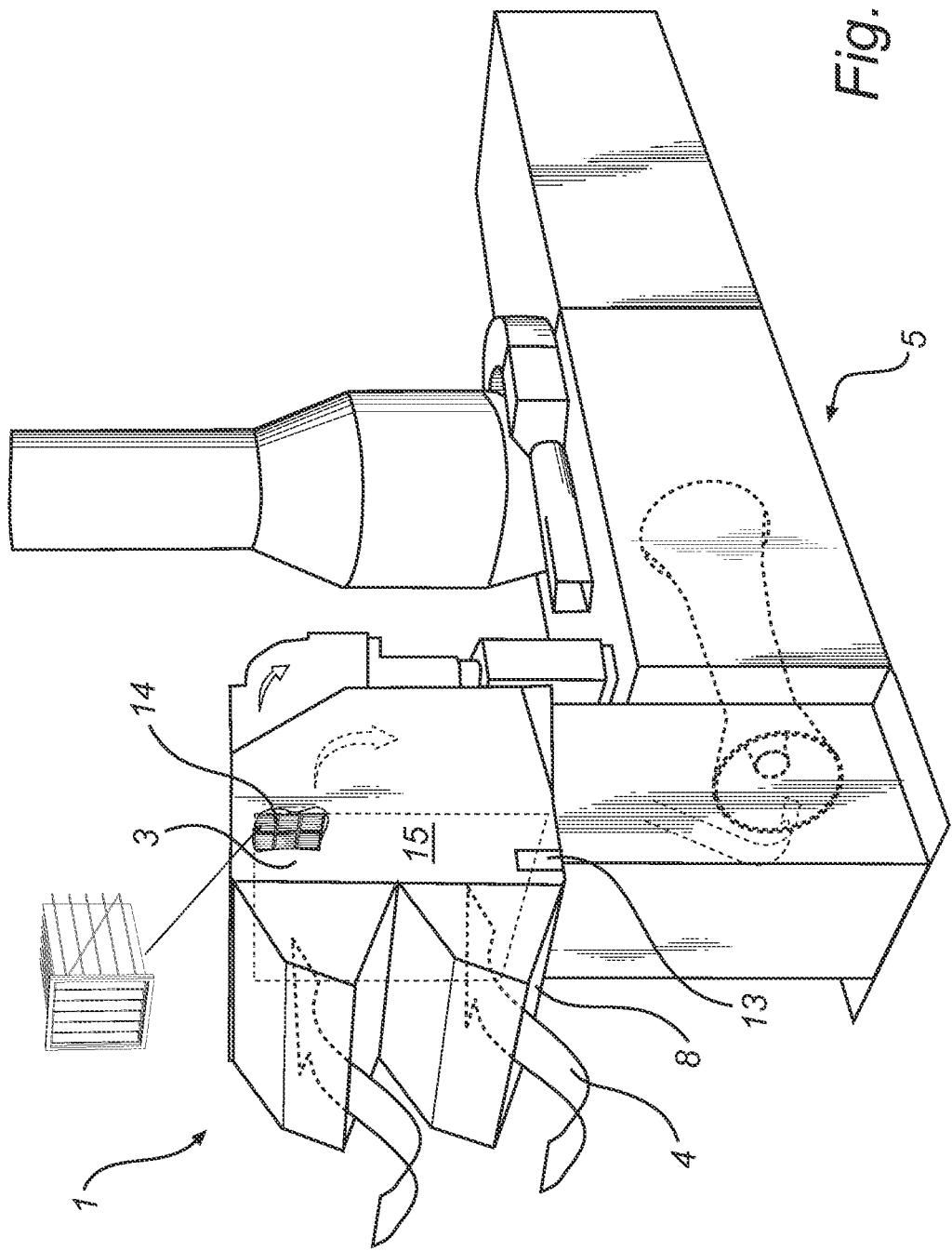
FIG. 2 is a schematic view of a gas turbine air intake according to the invention showing a close view of an embodiment of a particle filter assembly according to the invention.

In the example embodiment of FIG. 2, the air intake 1 is intended for a plant 2 in the form of a gas turbine plant 5. In this embodiment, the air intake 1 constitutes a gas turbine plant air intake.

In both the embodiment of FIG. 1 and FIG. 2, the air intake 1 comprises an air channel 3 for guiding ambient air in the form of an air stream 4 through the air intake 1. In the air channel, a front filter unit 6 and a back filter unit 7 are arranged. The front filter unit 6 and the back filter unit 7 are arranged in series such that the air stream passing through the air channel 3 passes first through the front filter unit 6 and then through the back filter unit 7 when flowing in the normal direction from an inlet 8 of the air intake 1 to the plant 2. The front filter unit 7 and the back filter unit 8 such arranged form a particle filter assembly.

The front filter unit 6 and the back filter unit 7 are particle filters for filtering particles that are trapped in the air stream 4 to avoid that harmful or otherwise unwanted particles enter the plant with the ingoing air stream 4.

The front filter unit 6 is a particle filter having a specified efficiency with respect to the ability of the filter to remove particles within a specified diameter range from an air stream. The specified particle diameter range corresponds to the diameter range of those particles that are unwanted for the plant in question and the intended operation thereof. In addition, the front filter unit 6 has a specified dust holding capacity corresponding to the ability of the filter of holding dust when operated at a specified airflow rate to a selected maximum resistance value.

The back filter unit 7 is also a particle filter having a specified efficiency and a specified dust holding capacity.

The specified efficiency as well as the specified dust holding capacity of the front filter unit 6 are higher than those of the back filter unit 7.

In the embodiment of FIG. 1, the front filter unit 6 and the back filter unit 7, comprise a filter body 9, 10 of non-woven, fluffy glass fiber, filtering material mat, which is held in a mounting frame 11, 12, respectively. The filter units are mounted in the air channel 3 of the air intake 1 by a friction joint formed between the respective mounting frame and the air channel 3. The front filter unit 6 and the back filter unit 7 are mounted in series in the air channel and at a distance from each other. Both filter units 6, 7 are removable mounted, wherein the front filter unit 6 is separately removable, or in other words, the front filter unit 6 is mounted such that it is removable while the back filter unit 7 remains mounted in the air channel 3.

In the embodiment of FIG. 1, the front filter unit 6 is accessible for exchange through the air inlet of the air intake.

In the example embodiment of FIG. 2 of an gas turbine plant air intake 1, several particle filter assemblies, each comprising a front filter unit 6 and a back filter unit 7 in series, are mounted in a rack construction 14 in rows and columns forming a filter wall 15 for the air stream 4 passing through the air channel 3. Thus, the several particle filter assemblies are coupled in parallel with respect to the air stream 4.

Figure 3:
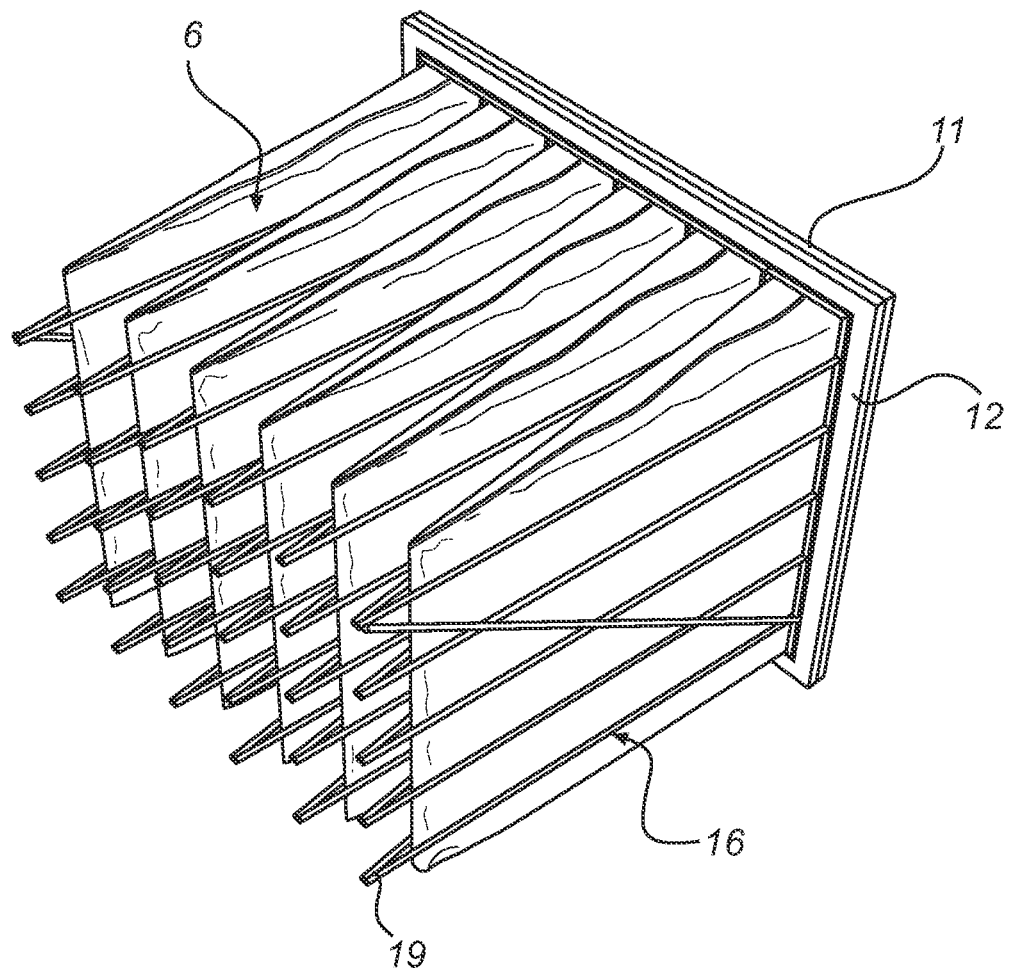
FIG. 3 is a perspective view of a particle filter assembly of an air intake according to an embodiment of the invention.
Figure 4:
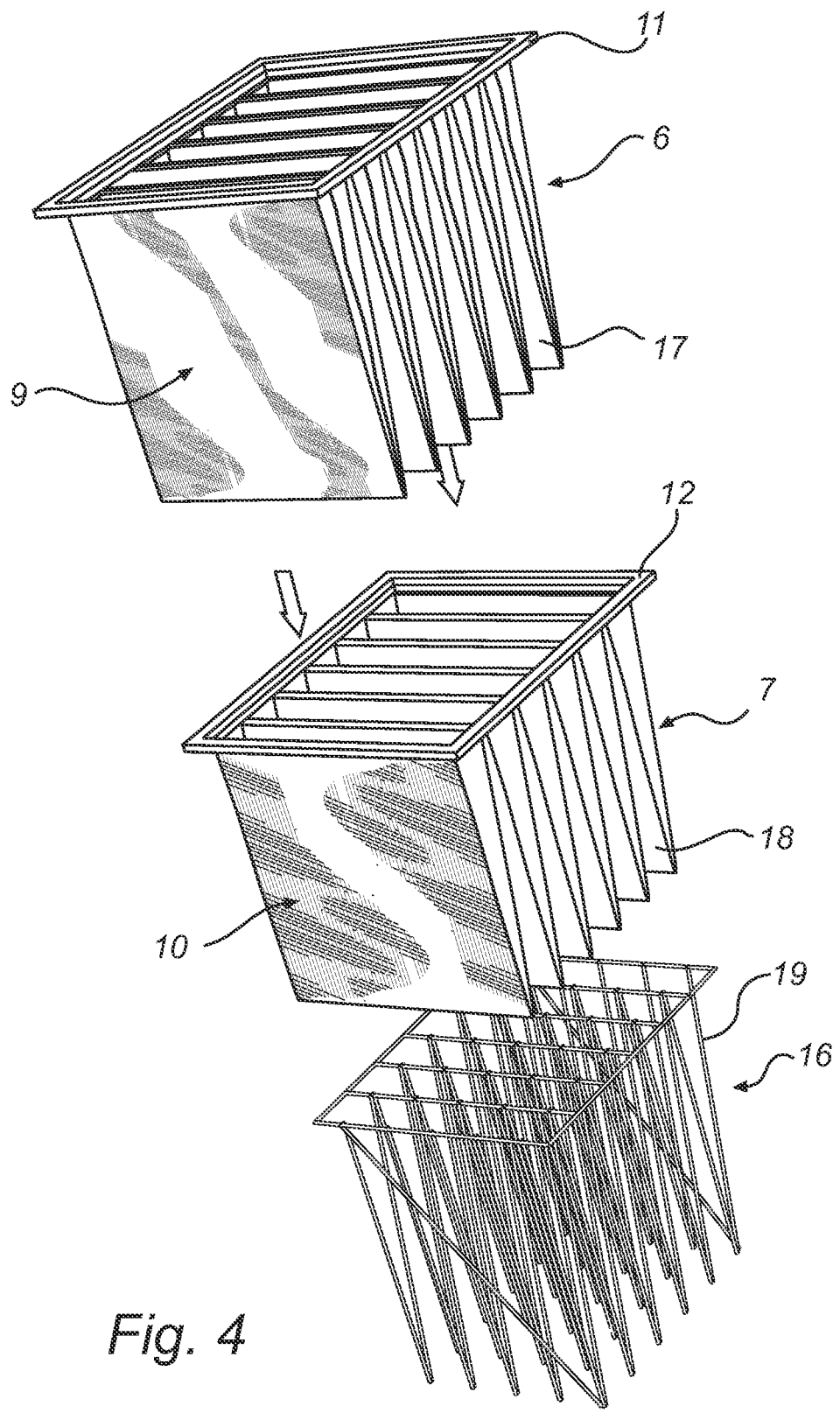
FIG. 4 is an exploded view of the particle filter assembly of an air intake as shown in FIG. 3.

In FIGS. 3 and 4, an example particle filter assembly according to an embodiment of the invention is shown.

First with reference to FIG. 4, the particle filter assembly is shown comprising a front filter unit 6, a back filter unit 7, and a framework structure 16.

The front filter unit 6 and the back filter unit 7 comprise a filter body 9, 10 in the form of a pocket filter body, respectively. The pocket filter body comprises several filter pockets 17, 18 respectively. The pocket filter body 9, 10 is mounted on a mounting frame 11, 12, respectively, wherein the filter pockets 17, 18 are mounted with their openings or mouths at the frame 11, 12 such that the pockets extend away from the frame 11, 12 substantially in parallel.

The filter material of the filter body 9, 10 is a non-woven, fluffy glass fiber, filtering material mat.

As stated above, the specified efficiency as well as the specified dust holding capacity of the front filter unit 6 are higher than those of the back filter unit 7. In this particular embodiment, the front filter unit 6 is constructed such that, if a particle containing air stream is directed there through, at least 90% of particles having 0.4 micrometer average diameter are caught in the front filter unit 6. If tested under the conditions that the air flow is 0.944 m3/s and the maximal final pressure drop over the filter is 450 Pa, the front filter unit belongs to the filter class F8 or better according to EN 779/ 2002, which is the "New European Standard for Coarse and Fine Filters" established by the European Committee for Standardization, Technical Committee 195 and Work Group 1 (CEN/TC195-WG1) in 2002. The back filter unit 7 belongs to filter class F7 or less according to same standard. Thus, if a particle containing air stream is directed there through, at most 90% of particles having 0.4 micrometer average diameter are caught in the back filter unit 7.

The framework structure 16 comprises support elements in the form of wire bars 19. The wire bars 19 are arranged in angled, V-shaped pairs.

With reference to FIG. 3, the particle assembly, which is shown dismounted in FIG. 4, is mounted. Thus, the back filter unit 7 has been inserted in the framework structure 16 with the pockets extending between pairs of angled bars 18. Furthermore, the front filter unit 6 has been inserted into the back filter unit, wherein the filter pockets 17 of the front filter unit 6 extend within the filter pockets 18 of the back filter unit 7, one front filter pocket 17 in each back filter pocket 18.

Thus, the front filter unit 6 is mounted close to the back filter unit 7. The filter bodies 9, 10 of the front filter unit 6 and the back filter unit 7, form double walled pockets, wherein the filter body 9 of the front filter unit 6 bear against the filter body 10 of the back filter unit 7.

As shown in FIG. 2, the particle filter assembly such assembled, is mounted in the rack 14 of the gas turbine air intake. The particle filter assembly is attached to the rack 14 by the framework structure 16 being attached thereto. The back filter unit 7 is removable attached to the framework structure by locking elements arranged at the frame 12 (not shown). The front filter unit 6, in turn, is removable attached to the back filter unit 7 by locking elements arranged at the frame 11 interacting with the frame 12 of the back filter unit 7 (not shown).

The front filter unit 6 can be accessed through a maintenance hatch 13.

The gas turbine air intake according to FIG. 3 can be operated in the following way.

The gas turbine plant s operated for electrical power generation. To this end, the gas turbine plant receives an air stream through the gas turbine air intake. The air channel 3 of the gas turbine air intake directs air stream through a filter wall comprised of rows and columns of particle filter assemblies as shown in FIGS. 3 and 4. Thus the air stream enters the pocket mouths and passes, in sequence, through a filter pocket wall of the front filter body 9 of the front filter unit 6 and through a filter pocket wall of the back filter body 10 of the back filter unit 7. This is aided by the bars of the framework structure 17 abutting against and holding the double walled pockets apart such that they do not collide with each other and mutually block the air flow there through. Consequently, harmful particles are trapped in the particle filter assembly and impeded from following the air stream into the gas turbine plant such that continuous operation thereof is ensured.

During continued operation, the particle filter assembly will eventually clog causing the resistance thereof to exceed a selected maximal value. Since the front filter unit 6 has a higher efficiency and dust holding capacity than the back filter unit 7, most particles are caught by the front filter unit 6. Thus, most of the clogging has taken place in the front filter unit 6, which thus needs to be replaced.

The air intake 1 is designed with a cross area that is large enough for the air stream to flow at a speed which enables an operator to enter the air intake and to replace a front filter unit 6. The operator can enter the gas turbine air intake through the maintenance hatch 13. There he/she has easy access to the particle filter assemblies mounted in the rack 14. He releases the locking elements of a front filter unit 6, pulls the front filter unit 6 away from the back filter unit 6, wherein the pockets 17 of the front filter unit 6 travel out of the pockets 18 of the back filter unit 7.

When the front filter unit 6 has been removed, the incoming air stream passes through the back filter unit 7 only. However, since the back filter unit 7 has received only a minor amount of particles during normal operation, the major amount having been caught by the front filter unit 6, the back filter unit 7 has the capacity to alone collect sufficient incoming particles during front filter unit 6 exchange so that the operation of the gas turbine plant is not jeopardized in spite of the lower efficiency and dust holding capacity of the back filter unit 7. Consequently, harmful particles are continuously trapped in the particle filter assembly and impeded from following the air stream into the gas turbine plant and continuous operation thereof is ensured.

Then, the operator takes a fresh front filter unit 6, holds it in the air stream such that the air flows into the pockets 17 through the pocket mouths and fills the pockets 17. Then, aided by the air pressure, the operator inserts the pockets 17 of the fresh front filter unit 6 into the pockets 18 of the back filer unit 7. Finally, the operator locks the locking elements and secures the fresh front filter unit in the air channel 3. After having replaced all or a selected number of front filter units in the rack 14, the operator removes the used front filter units 6 through the maintenance hatch 13 and exits himself/herself.

Consequently, the operation of front filter exchange can take place during operation of the gas turbine plant while an air stream is passing through the air intake 1, and while the back filter unit 7 remains in position.

The back filter unit 7 has a lower efficiency and dust holding capacity than the front filter unit 6, however, the efficiency and the dust holding capacity of the back filter unit 7 are selected to be sufficient to enable the back filter unit 7 to operate satisfactory during several front filter unit exchanges. Preferably, the back filter unit 7 will be able to operate for so many front filter unit 6 replacements that have to take place between two scheduled stand stills of the gas turbine plant for other reasons, such as for reasons of periodical inspection or standard maintenance.

The invention claimed is:

1. An air intake for a gas turbine plant, comprising
a major body defining an air channel; and
a particle filter assembly arranged in the air channel, the particle filter assembly including a front filter unit and a back filter unit,
the particle filter assembly being configured to remove particles from an air stream passing through the air channel of the air intake and into the gas turbine such that the front filter unit has a higher efficiency and dust holding capacity than the back filter unit,
the front filter unit being arranged before and in series with the back filter unit such that an air stream passing through the air channel passes through the front filter unit before passing through the back filter unit,
the front filter unit being arranged in the air channel such that the front filter unit is removable and replaceable by a fresh front filter unit while the back filter unit remains in the air channel and while an air stream is passing through the air channel during operation of the plant.

2. The air intake according to claim 1, wherein the efficiency and the dust holding capacity of the back filter unit is selected such that, when a plant is operated with an estimated air stream containing an estimated amount of particles passing through the air intake, the back filter unit is able to remove sufficient particles for the plant to operate with the back filter unit only during several periods of front filter unit exchange.

3. The air intake according to claim 1, wherein the front filter unit and the back filter unit are pocket filter units comprising a plurality of filter pockets.

4. The air intake according to claim 3, wherein the filter pockets of the front filter unit are arranged within the filter pockets of the back filter unit.

5. The air intake according to claim 4, wherein
the particle filter assembly includes a support structure with support elements, wherein the support elements are arranged to abut the sides of the filter pockets of the back filter unit such that sideway flexing of the filter pockets of the back filter unit is hindered, and
a free passage for the filter pockets of the front filter unit into and out of the filter pockets of the back filter unit is formed.

6. The air intake according to claim 5, wherein the support elements abut the outsides of the filter pocket sides of a respective one filter pocket of the back filter unit.

7. The air intake according to claim 6, wherein the support elements constitute a framework structure including a plurality of pairs of v-shaped bars abutting the sides of a respective one filter pocket of the back filter unit, the framework structure further including supplementary bars to substantially fix the positions of the v-shaped bars of the framework structure.

8. The air intake according to claim 7, wherein
the back filter unit includes a back filter mounting frame from which the plurality of filter pockets extends,
the front filter unit includes a front filter mounting frame from which the plurality of filter pockets extends,
the framework structure is releasable attached to the air channel,
the back filter mounting frame is releasable attached to the framework structure and arranged with the filter pockets extending between the v-shaped bars thereof,
the front filter mounting frame is releasable attached to back filter mounting frame with the filter pockets extending into the filter pockets of the back filter unit.

9. The air intake according to claim 1, wherein the air intake is a gas turbine plant air intake.

10. A gas turbine system, comprising:
a gas turbine plant; and
the air intake of claim 1 connected to the gas turbine plant,
wherein the air intake is configured to remove particles from an ambient air source, the ambient air source being the air stream passing through the air channel of the air intake.

* * * * *